United States Patent Office 3,492,093
Patented Jan. 27, 1970

3,492,093
DECOMPOSITION OF HYDROGEN PEROXIDE
John F. Start, Trenton, N.J., Leonard Seglin, New York, N.Y., and Borivoj R. Franko-Filipasic, Morrisville, Pa., assignors to FMC Corporation, New York, N.Y., a corporation of Delaware
No Drawing. Original application Mar. 22, 1965, Ser. No. 441,923, now Patent No. 3,423,330, dated July 16, 1968. Divided and this application Aug. 7, 1968, Ser. No. 750,763
Int. Cl. C01b 1/03
U.S. Cl. 23—204                                 3 Claims

ABSTRACT OF THE DISCLOSURE

Dilute hydrogen peroxide is decomposed by being contacted with a catalyst which is argentous oxide distributed on granular, porous aluminum oxide or absorbent carbon.

---

This application is a division of application Ser. No. 441,923, filed Mar. 22, 1965, now Patent No. 3,423,330; Ser. No. 441,923 is a continuation-in-part of application Ser. No. 410,959, filed Nov. 13, 1964 and now abandoned.

Application Ser. No. 410,959 describes a number of devices in which aqueous solutions of surfactants are fed into a decomposition chamber along with dilute hydrogen peroxide, where a catalyst is present which decomposes the hydrogen peroxide with the simultaneous production of oxygen and heat, thereby producing warm to hot lather useful for shaving, shampooing, etc. Preferably, the peroxide is mixed with the detergent solution before being admitted to the decomposition chamber; this requires special formulations to insure against premature decomposition of the peroxide.

While there are a host of materials which will induce the decomposition of hydrogen peroxide and work after a fashion in these devices, the preparation of a sound commercial device is contingent upon the use of a catalyst which fulfills as many as possible of a rather substantial number of requirements. First, it is desirable that the catalyst act rapidly so that the device can be used with a minimum of delay. This is particularly true in the case of the preparation of shaving lather, where it is highly desirable that only a few seconds elapse between the time the device is activated and the time the lather is fed out of the device. It is desirable, moreover, that rather small amounts of catalyst be used, in order to reduce cost, to reduce the loss of heat by absorption in the catalyst, and to insure against excessive pressure drop due to the catalyst. Moreover, the catalyst must be able to work with rather dilute peroxide of the order of 10% or less in the presence of the surfactant. Another desirable attribute of a catalyst is its ability to substantially exhaust the hydrogen peroxide in a very short time so that there is essentially little or no peroxide left in the foam as discharged from the container. Finally, the catalyst should be in a mechanical form such that it is retained in the catalyst chamber and not carried back to the main body of the peroxide or out with the foam, since even the most innocuous materials might be objectionable to the user.

We have discovered a method of decomposing dilute hydrogen peroxide with particular catalysts which meet all of these requirements for use with dilute aqueous hydrogen peroxide surfactant solutions. Our new catalysts comprise argentous oxide distributed on an absorbent carrier which is either a granular porous aluminum oxide or absorbent carbon.

In one method of preparing the catalyst, we saturate granules of the porous aluminum oxide with an aqueous silver salt solution; precipitation of the silver content results. The solubles are washed out and the product is dried at or below 100° C. to remove the water. In a second method we impregnate the non-powdery porous substrate with silver ammonia hydroxide, which is then decomposed at a relatively low temperature to produce argentous oxide, ammonia and water.

It has been known for many years that most heavy metals and their compounds will tend to decompose hydrogen peroxide on contact, and a great deal of work has been done on the stabilization of peroxide against this decomposition. However, the decomposition rates with most of these materials are rather slow. The action of these decomposition catalysts on dilute hydrogen peroxide in the presence of surfactants which are natural film formers is even slower than on the concentrated peroxides with which most of the catalyst studies have been done. Moreover, most of the catalyst study work that has been done has not been concerned with rapid decomposition of dilute solutions accompanied by exhaustion of the peroxide.

Of all the heavy metals and heavy metal compounds we have studied, argentous oxide ($Ag_2O$) and lead oxides appear to be the most active. However, because of the fact that lead is a cumulative poison, it cannot be considered in a use where the product coming in contact with it will be used in the way that the latter is intended to be used.

However, argentous oxide by itself is not a satisfactory catalyst. If it is used in powdered form, it will be swept out of the device and lost. If used in granular form, the product not only is too expensive, but it has too high a heat capacity as compared with its active surface, so that it absorbs too large a percentage of the heat which would otherwise go into the lather.

A satisfactory product can be made by distributing the silver oxide on our non-powdery, porous carriers, porous granules of aluminum oxide or active carbon.

The porous base should be in non-powdery form, i.e., relatively free of particles below about 100 mesh (American standard) and most preferably considerably coarser. The preferred granules are +60 mesh. Generally, about 5 to 50% argentous oxide is deposited on the base, for most convenient handling.

Typical examples of the invention are as follows:

EXAMPLE 1

Silver oxide on alumina

To a liter beaker containing 730 grams of 52% aqueous silver nitrate was charged 270 grams of activated alumina, described as follows:

Particle size range _____ mesh __ 30–100
Bulk density _____ 0.96
Specific gravity _____ 3.99

The mixture was heated with stirring to the boiling point and allowed to cool to room temperature with occasional stirring. The mixture was filtered on a medium sized porous glass funnel with suction to remove excess solution. The wet solids were transferred to an 800 ml. beaker and warmed with agitation to drive off water and obtain a fluid bed of solids. The beaker and its light-colored contents were heated further over an open flame and with constant agitation until decomposition commenced, as evidenced by the dark fumes of nitrogen dioxide which appear at or about 444° C. Heating was continued at the decomposition temperature, until the dark fumes no longer appeared and the solids were a uniform dull black. The entire process required forty minutes. Excessive or prolonged heating was avoided because of the slow reduction of silver oxide to silver which is brought about at temperatures over 180°. The dark colored solids were allowed to cool and were passed through sieves in order to obtain a narrow range of material of the following characteristics:

| | |
|---|---|
| Particle size range _____mesh__ | 30–40 |
| Bulk density _____ | 1.38 |
| Specific gravity _____ | 4.13 |
| Percent silver content at $Ag_2O$ _____ | 23.22 |

To protect the catalyst a Plexiglas cylindrical chamber of dimensions ½ inch I.D., 1 inch length with ⅜ inch openings was utilized for testing. A 60 mesh screen was inserted in the chamber over each opening. The chamber was then packed with 4.77 grams of the described granules. A solution of 10% aqueous hydrogen peroxide was pumped continuously through the chamber at the rate of 19.5 ml./min. and a chamber pressure of 1.0 p.s.i.g. The temperature of the effluent stream was recorded and percent of hydrogen peroxide remaining in the stream obtained at intervals by standard means. The results of the experiment are tabulated below as Run I. The apparatus was allowed to cool over a period of 18 hours and the experiment was repeated in order to check the activity of the used catalyst. Data are recorded below as Run II.

RUN I

| Time | Temp., °F. | Percent $H_2O_2$ decomposed |
|---|---|---|
| 0 | 80 | 0 |
| 1 min | 162 | 100 |
| 5 min | 168 | 100 |
| 10 min | 168 | 99.9 |
| 15 min | 167 | 99.5 |
| 20 min | 166 | 98.7 |

RUN II

| Time | Temp., °F. | Percent $H_2O_2$ decomposed |
|---|---|---|
| 0 | 79 | 0 |
| 15 sec | 135 | 100 |
| 1 min | 161 | 99.9 |
| 5 min | 167 | 99.4 |
| 10 min | 167 | 98.3 |
| 15 min | 166 | 96.9 |
| 20 min | 166 | 95.5 |

The catalyst was tested in a foam producing device in which a main storage chamber contained a mixture of surfactant, hydrogen peroxide and water of the following composition:

| | Parts by weight |
|---|---|
| Polyoxyethylated octyl phenol _____ | 7.5 |
| Polyoxyethylene lauryl alcohol _____ | 7.5 |
| $H_2O_2$ (100%) _____ | 10 |
| Water _____ | 75 |

A decomposition chamber was provided in the shape of a tube 2.5 cm. long and about a centimeter in inside diameter, packed with +60 mesh catalyst, and with a screen at each end to prevent removal of the granular catalyst. The chamber was filled with foamable solution. Foaming started immediately and lather began to come out; it had warmed up within a few seconds and continuously increased in temperature for about 30 seconds. When the lather was contained in the tube by holding the end with a finger to simulate a valve, it was possible to get warm lather from the tube after about ten seconds.

EXAMPLE 2

Silver oxide on active carbon

A saturated solution of silver ammonia hydroxide $[Ag(NH_3)_2OH]$ was prepared by agitating an excessive amount of dried silver oxide in 20 ml. of concentrated aqueous ammonia at 25°. The mixture was filtered. Four grams of 40 to 60 mesh activated coconut charcoal (Amend Drug and Chem. Co.) was charged into the filtered, saturated solution. The material was allowed to soak with occasional stirring. After one hour the mixture was filtered with suction to remove excess solution, the solids were dried in warm air until the evolution of ammonia ceased and the material was dry. It was then washed with water containing traces of chlorine to remove soluble material and redried in warm air. The ability of the solids to initiate decomposition of dilute aqueous peroxide was checked as above and was shown to be about 3.0 times more active than the silver oxide on alumina described in Example 1.

Obviously these examples can be multiplied indefinitely without departing from the spirit of the invention which is defined in the claims.

We claim:

1. The method of rapidly decomposing hydrogen peroxide which comprises contacting dilute hydrogen peroxide with a catalyst comprising argentous oxide deposited on a porous, non-powdery base from the group consisting of alumina and active carbon.

2. The method of claim 1 in which the porous base is alumina.

3. The method of claim 1 in which the porous base is active carbon.

References Cited

UNITED STATES PATENTS

| 3,347,630 | 10/1967 | Baumgartner et al. | 23—204 |
| 3,363,982 | 1/1968 | Baumgartner et al. | 23—204 |
| 3,363,983 | 1/1968 | Roberts | 23—204 |
| 3,389,963 | 6/1968 | Baumgartner et al. | 23—204 |

PATRICK P. GARVIN, Primary Examiner

U.S. Cl. X.R.

252—94, 186, 307, 447, 463

UNITED STATES PATENT OFFICE
CERTIFICATE OF CORRECTION

Patent No. 3,492,093      Dated January 27, 1970

Inventor(s) John F. Start, Leonard Seglin and Borivoj R. Franko-Filipasic

It is certified that error appears in the above-identified patent and that said Letters Patent are hereby corrected as shown below:

Column 2, line 28, "latter" should read --lather--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents